United States Patent
Kang et al.

(10) Patent No.: US 10,617,963 B2
(45) Date of Patent: Apr. 14, 2020

(54) METHOD AND SYSTEM FOR CONTROLLING VIRTUAL REALITY ATTRACTION

(71) Applicants: Too Hwan Kang, Seoul (KR); Sang Doo Nam, Icheon-si (KR)

(72) Inventors: Too Hwan Kang, Seoul (KR); Sang Doo Nam, Icheon-si (KR)

(*) Notice: Subject to any disclaimer, the term of this patent is extended or adjusted under 35 U.S.C. 154(b) by 0 days.

(21) Appl. No.: 16/327,785

(22) PCT Filed: Aug. 21, 2017

(86) PCT No.: PCT/KR2017/009093
§ 371 (c)(1),
(2) Date: Feb. 22, 2019

(87) PCT Pub. No.: WO2018/038485
PCT Pub. Date: Mar. 1, 2018

(65) Prior Publication Data
US 2019/0217210 A1 Jul. 18, 2019

(30) Foreign Application Priority Data
Aug. 22, 2016 (KR) .................. 10-2016-0105991

(51) Int. Cl.
*A63G 31/16* (2006.01)
*G06F 16/00* (2019.01)
(Continued)

(52) U.S. Cl.
CPC .............. *A63G 31/02* (2013.01); *A63G 31/16* (2013.01); *G02B 27/01* (2013.01); *G06F 3/01* (2013.01);
(Continued)

(58) Field of Classification Search
CPC ........ A63G 31/00; A63G 31/02; A63G 31/04; A63G 31/16; G06F 16/00
(Continued)

(56) References Cited

U.S. PATENT DOCUMENTS

2003/0211896 A1* 11/2003 Wang ................... A63G 31/16
472/59
2009/0075741 A1* 3/2009 Milligan ............... A63G 31/16
472/60
(Continued)

FOREIGN PATENT DOCUMENTS

KR   10-2008-0106676 A   12/2008
KR   10-2009-0064634 A    6/2009
(Continued)

*Primary Examiner* — Kien T Nguyen
(74) *Attorney, Agent, or Firm* — Maschoff Brennan

(57) ABSTRACT

A method and system are used to control a virtual reality attraction that allows a user to experience virtual reality on the basis of the movements of a machine component onto which a user is boarding and image data displayed through an image component to a user. The method includes generating real image contents including real image data photographed by a user's mobile terminal, and metadata including time data and positional data at the time of photographing the real image data. The real image contents are received by the virtual reality attraction as control contents. The virtual reality attraction is controlled to drive the movement of the machine component on the basis of the metadata and at the same time synchronously display the real image data on the image component on the basis of the metadata.

14 Claims, 9 Drawing Sheets

(51) Int. Cl.
  *A63G 31/02* (2006.01)
  *G02B 27/01* (2006.01)
  *H04N 5/74* (2006.01)
  *G06F 3/01* (2006.01)
  *H04L 29/06* (2006.01)
  *H04L 29/08* (2006.01)
  *G06Q 30/02* (2012.01)

(52) U.S. Cl.
  CPC .............. *G06F 3/011* (2013.01); *G06F 16/00* (2019.01); *H04L 67/38* (2013.01); *H04N 5/7491* (2013.01); *G06Q 30/0256* (2013.01); *H04L 67/2804* (2013.01)

(58) Field of Classification Search
  USPC .............................. 472/59–61, 130; 463/1, 7
  See application file for complete search history.

(56) References Cited

U.S. PATENT DOCUMENTS

| | | | |
|---|---|---|---|
| 2009/0149265 A1* | 6/2009 | Holzberg | A63G 31/00 472/59 |
| 2015/0246291 A1* | 9/2015 | Milam | A63G 31/16 472/59 |

FOREIGN PATENT DOCUMENTS

| | | |
|---|---|---|
| KR | 10-1131097 B1 | 3/2012 |
| KR | 10-2013-0014760 A | 2/2013 |
| KR | 10-2016-0025731 A | 3/2016 |

\* cited by examiner

310

METHOD AND SYSTEM FOR CONTROLLING VIRTUAL REALITY ATTRACTION

TECHNICAL FIELD

The present invention relates to virtual reality attraction control technology, and more particularly to a method and system for controlling a novel virtual reality attraction, which provide real image data, created by an ordinary user, as control content of a virtual reality attraction, which is configured to enable the experience of virtual reality, thereby realizing easy creation of the control content of the virtual reality attraction based on a real image captured in reality.

BACKGROUND ART

In general, an attraction refers to a mechanism that is a ride provided in an amusement park, for example, and gives a user pleasure by providing the user with a variety of combinations of movements including, for example, rotation, tilting, constant-speed movement, acceleration, horizontal movement, and vertical movement while the user is positioned on the ride. In recent years, an attraction (hereinafter, referred to as "virtual reality attraction") has been developed, which enables a user to experience immersive virtual reality (VR) by mechanically driving a mechanism on which the user is positioned and, at the same time, providing the user with an image accompanying a predetermined scenario. Further, a technology related to such a virtual reality attraction has also recently been expanding to various fields, such as a simulator, a fitness device, and a game device, in addition to a ride, according to the development of a head mounted display (HMD), three-dimensional image technologies, and a 360-degree VR image, for example.

FIG. 1 schematically illustrates the configuration of a conventional virtual reality attraction 100. As illustrated, the virtual reality attraction 100 includes a machine component 130, on which a user is positioned, and an image component 150 on which an image is displayed to the user, and further includes an attraction control unit 110 for controlling the aforementioned components. The control unit 110 may receive control content input thereto or read the control content from a storage, and may control the machine component 130 and the image component 150 based on the control content.

In this example, the control unit 110 may control movement of the machine component 130 on which the user is positioned by driving, for example, one or more motors based on machine driving data included in the control content. For example, the machine driving data includes data necessary for movement of the machine component 130 in three dimensions, such as translation in a predetermined direction, rotation in a predetermined direction, maintenance of a predetermined posture, or a change in posture. Through control based on such machine driving data, the machine component 130 may be controlled to perform movement, such as maintenance or change of a predetermined posture, movement in the vertical direction (in the Z-axis), movement in the transverse direction (in the Y-axis), movement in the longitudinal direction (in the X axis), roll (rotation about the X-axis), pitch rotation (about the Y axis), or yaw rotation (about the Z axis), or combinations thereof.

In addition, the control unit 110 may cause a predetermined image to be displayed on the image component 150, such as a screen in front of the user or an HMD worn by the user on the head, based on image data included in the control content.

Further, the control unit 110 may constitute a virtual reality attraction that interacts with the user by receiving feedback data, which is input, for example, when the user who is on the machine component 130 operates a steering wheel provided in the machine component 130 or presses a pedal, and adjusting the movement of the machine component 130 and the image to be displayed on the image component 150 in response to the user feedback.

However, in the conventional virtual reality attraction, generally, the machine driving data for the operation of a machine and the image data for the display of an image, which are included in the control content, are separately programmed. Then, the image data for provision of virtual reality has been generally generated based on computer graphics (CG), even though the image data partially includes a real image. Therefore, since the control content of the conventional virtual reality attraction requires the planning of a predetermined virtual reality scenario as well as specialized labor for CG creation, there is a limitation that the control content is provided by a time-consuming and costly process. Accordingly, the conventional virtual reality attraction may not have sufficient content required to allow the user to experience various virtual realities, and may not easily provide the control content. Moreover, there is a limitation that the content may not be shared in various manners.

DISCLOSURE

Technical Problem

The present invention has been made in order to solve the problems of the control content provision technology of the conventional virtual reality attraction described above, and more particularly, it is one object of the present invention to provide a method and system for controlling a novel virtual reality attraction, which provide real image data, generated by an ordinary user using a mobile terminal, as control content of the virtual reality attraction (i.e. content including data for controlling a machine component and image data for an image component), thereby realizing easy creation of the control content of the virtual reality attraction based on a real image captured by the ordinary user in reality and enabling sharing of the control content in various manners.

As used herein, the term "virtual reality attraction" refers to a device that includes a mechanical component, which enables a user to experience virtual reality, and an image component for image display, and refers to a wide range of devices as technically possible, without any particular limitation. For example, the mechanical component includes any of devices in various fields, such as a simulator, a fitness device, or a game device, as well as a ride. The component for image display includes any of various devices, such as a screen, a monitor, a head mounted display, smart glasses, or head gear equipped with a separate display device (e.g., a smartphone).

Specifically, it is another object of the present invention to provide a method and system for controlling a novel virtual reality attraction, which enable an ordinary user who installs, on their smartphone, for example, an application for the generation of real image content as "control content of the virtual reality attraction" to generate the real image content in which real image data, captured using a camera installed in the smartphone or an external camera, is combined with metadata including at least some values among values indicating the time, position, angle, tilt, posture, acceleration, speed, latitude, and orientation, which may be obtained from internal and external sensors of the smartphone (e.g., a GPS sensor, a proximity sensor, a motion sensor, an air pressure sensor, and a geomagnetic sensor), and to easily create and provide the control content of the virtual reality attraction by providing the generated real image content as the control content of the virtual reality attraction.

In addition, it is yet another object of the present invention to provide a method and system for controlling a novel virtual reality attraction, which enable an ordinary user to upload or download real image content, including real image data for image display and metadata for machine driving, to or from a content server, which takes the form of a web server operating on a network, e.g., the Internet, thereby realizing easy sharing of various control content for the virtual reality attraction in various manners (e.g., in a one-to-one manner, in a one-to-many manner, and in a many-to-one manner).

Technical Solution

The above objects are accomplished by a method and system for controlling a virtual reality attraction provided according to the present invention.

In accordance with one aspect of the present invention, provided is a method for controlling a virtual reality attraction that allows a user to experience virtual reality based on movement of a machine component on which the user is positioned and image data displayed to the user via an image component, the method including generating real image content including real image data captured by a mobile terminal of the user and metadata including at least time data of a time at which the mobile terminal captures the real image data and position data of the mobile terminal, receiving, by the virtual reality attraction, the real image content as control content, and driving the virtual reality attraction so as to control the movement of the machine component based on the metadata of the received real image content and display the real image data of the received real image content on the image component by synchronizing the real image data based on the time data included in the metadata.

The mobile terminal may include a processor, a memory, a camera, a time detection sensor, and a position detection sensor. The mobile terminal may be provided with a computer executable application for generation of the real image content for controlling the virtual reality attraction, the application being coded to perform, when executed by the processor, an operation of generating the real image content by combining the real image data captured by the camera with the metadata generated to include at least the time and position data of the time at which the real image data is captured from the time detection sensor and the position detection sensor. In addition, the mobile terminal may further include a storage that stores therein the real image content generated when the application is executed by the processor or a transmission module that transmits the real image content to an external device.

The metadata may further include at least one of posture data indicating a posture of the mobile terminal and an acceleration or a speed indicating movement of the mobile terminal, in addition to the time data and the position data.

The receiving may be performed using a mobile memory medium.

The receiving may be performed via a content server that provides a service capable of uploading or downloading the real image content through a communication network when both the mobile terminal and the virtual reality attraction are connected thereto through the communication network.

The generating the real image content by the mobile terminal, uploading the generated real image content to the content server, downloading the uploaded real image content from the content server to the virtual reality attraction, and the driving the virtual reality attraction based on the downloaded real image content may be performed at the same time.

The content server may add additional content so as to be to downloaded as part of the real image content, and the virtual reality attraction may process the additional content so as to be displayed to the user via the image component.

The driving the virtual reality attraction may further include adjusting, based on feedback data input by the user via the machine component, the movement of the machine component based on the metadata and adjusting the image data to be displayed on the image component based on the adjusted movement of the machine component by the virtual reality attraction The driving the virtual reality attraction may further include comparing, by the virtual reality attraction, feedback data input by the user via the machine component with movement data of the machine component to be driven based on the metadata, evaluating the user based on the comparing, and displaying an evaluation result to the user.

In addition, in accordance with another aspect of the present invention, provided is a virtual reality attraction system configured to perform any one of the virtual reality attraction control methods described above.

Advantageous Effects

According to the present invention, it is possible to allow anyone to easily create control content for the mechanical driving and image display of a virtual reality attraction and to enable the control content to be shaped in various manners.

More particularly, according to the present invention, by providing real image data, generated by an ordinary user using a mobile terminal, as control content of an attraction device for the experience of virtual reality, it is possible to realize easy creation of the control content based on a real image captured in reality and to enable sharing of the control content in various manners.

Specifically, by installing an application that allows an ordinary user to generate image content as attraction control content in a smartphone, for example, it is possible to generate real image content in which real image data, captured using a camera installed in the smartphone or an external camera, is combined with metadata including at least some values among values indicating the time, position, angle, tilt, posture, acceleration, speed, latitude, and orientation, which may be obtained from internal and external sensors of the smartphone (e.g., a GPS sensor, a proximity sensor, a motion sensor, an air pressure sensor, and a geomagnetic sensor), and it is possible to provide the generated real image content as the control content of the virtual reality attraction. In this way, the present invention enables even an ordinary user, not an expert, to easily create the control content of the virtual reality attraction.

In addition, according to the present invention, it is possible to allow an ordinary user to upload or download real image content, created by the user, to or from a content server, which takes the form of a web server operating on a network, e.g., the Internet. In this way, the present invention realizes easy creation of various control content for the virtual reality attraction and enables easy sharing of the control content in various manners.

BEST MODE

Hereinafter, the present invention will be described in detail by way of example with reference to the accompanying drawings.

Figure 1:
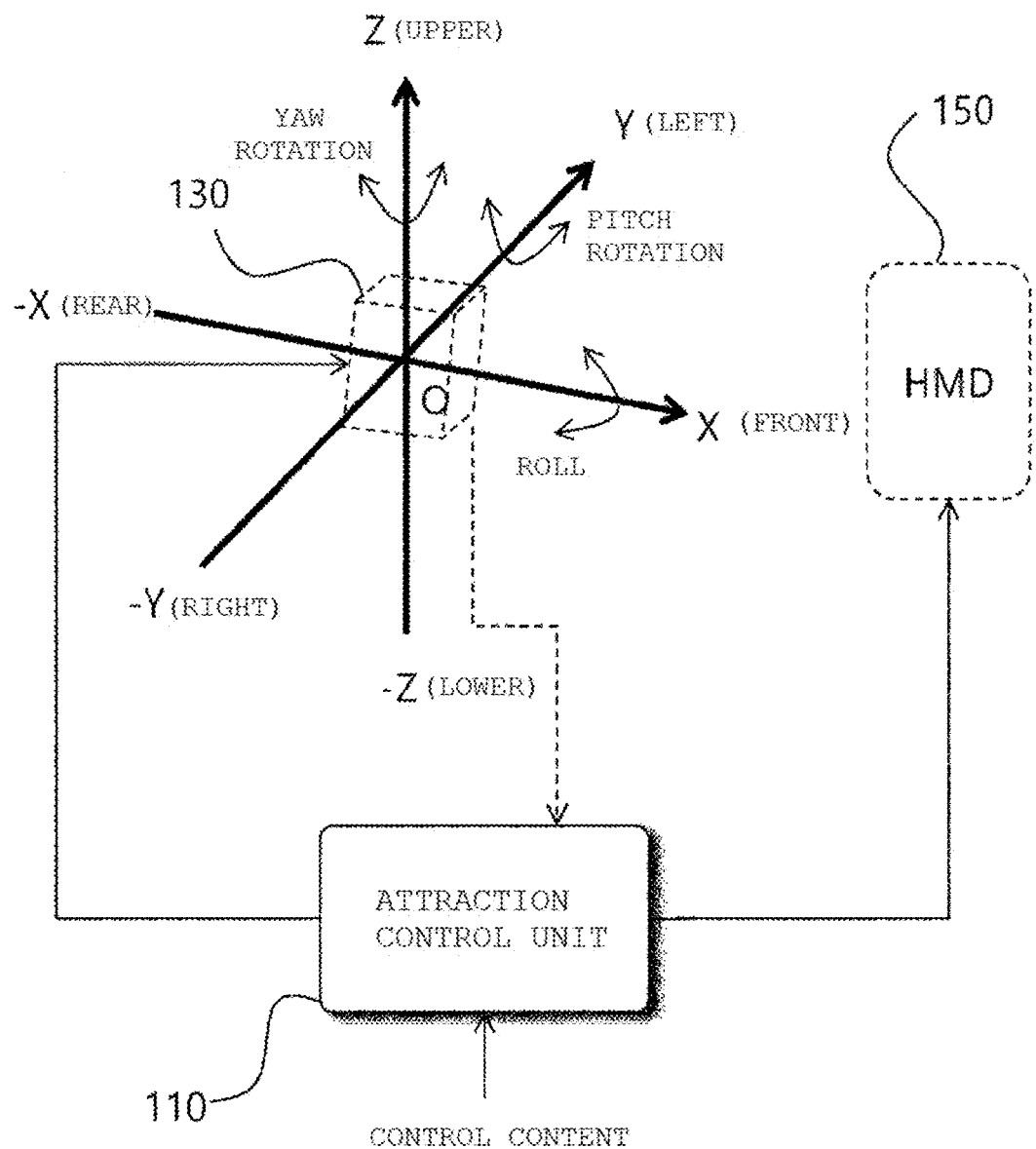
FIG. 1 is a schematic view illustrating the configuration of a conventional virtual reality attraction.
Figure 2:
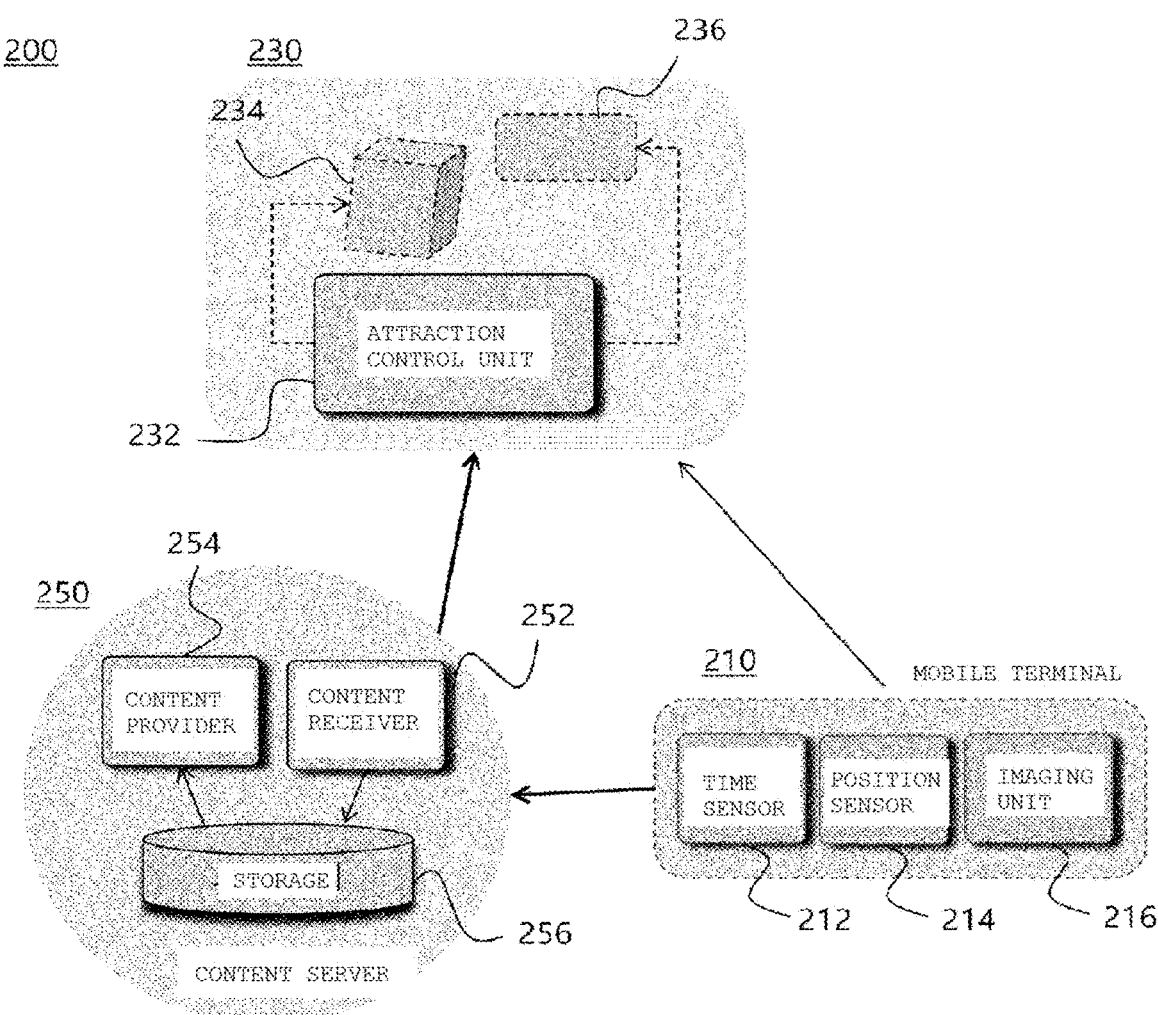
FIG. 2 is a schematic view illustrating the overall configuration of a virtual reality attraction system according to an embodiment of the present invention.

FIG. 2 is a schematic view illustrating the overall configuration of a virtual reality attraction system according to an embodiment of the present invention.

Referring to FIG. 2, the virtual reality attraction system 200 includes a mobile terminal 210, a virtual reality attraction 230, and a content server 250. The virtual reality attraction system 200 according to the present invention is a system that controls the virtual reality attraction 230 using image content, which is captured in reality by an ordinary user using the mobile terminal 210.

The mobile terminal 210 may be, for example, a portable computing device having a processor, a memory, computing software, a communication module, and an external memory connection port, for example, such as a smartphone, a smart watch, or smart glasses. In particular, in this case, the mobile terminal 210 may be provided with a computer executable application for the generation of real image content (hereinafter, simply referred to as "content generation application") for controlling the virtual reality attraction, the application being coded to enable the implementation of an operation of generating real image content when executed by the processor of the mobile terminal.

In this example, the content generation application generates real image content for the control of the virtual reality attraction by combining metadata with real image data captured by an imaging unit 216 of the mobile terminal 210. Here, the metadata may be data generated based on data indicating the time at which the real image data is captured by the imaging unit 216 and the position of the mobile terminal from a time sensor 212 and a position sensor 214. The metadata may further include, for example, a time value, a positional value within, for example, three-dimensional coordinates (latitude, longitude, and altitude), a value indicating the posture of the mobile terminal, such as an inclination or a gradient, a value indicating the movement speed of the mobile terminal, and a value indicating the acceleration of the mobile terminal.

In the illustrated example, the mobile terminal 210 includes the imaging unit 216, such as a camera installed in a smartphone, for example, or an external camera connected to the smartphone by a cable or a short-range wireless communication network such as Bluetooth, and the time and position sensors 212 and 214 which sense the time at which an image is captured by the camera and the position of the mobile terminal. The position sensor 214 may include, for example, a GPS module that receives position information from a global positioning system (GPS) satellite and calculates the current position of the mobile terminal.

The virtual reality attraction 230 includes a machine component 234 on which a user is positioned, an image component 236 for providing image data to the user, and a control unit 232 for controlling the aforementioned components. The control unit 232 controls the movement of the machine component 234 and controls the image component 236 so as to display an image, thereby enabling the user who is on the machine component 234 and views an image via the image component 236 to experience virtual reality.

In particular, according to the present invention, the control unit 232 of the virtual reality attraction 230 may receive real image content created by the mobile terminal 210, and may perform a control operation based on the received real image content. In other words, the control unit 232 performs control to drive the machine component 234 so as to move based on metadata included in the real image content and to cause the image component 236 to display real image data included in the real image content. The movement of the machine component 234 and the real image data displayed on the image component 236 may be synchronized with each other based on time data included in the metadata.

In the drawing, the arrow that points directly from the mobile terminal 210 to the virtual reality attraction 230 indicates that the real image content created by the mobile terminal 210 is directly input to the virtual reality attraction 230. For example, the user may store the created real image content, which is captured using the mobile terminal 210 of the user, in a storage within the mobile terminal 210, and then may transmit the real image content to the virtual reality attraction 230 using a cable connected thereto or a universal serial bus (USB) memory card or by short-range wireless communication such as Bluetooth.

Such a system provides an advantage in that ordinary people who have no special knowledge or experience may easily provide control content of the virtual reality attraction 230. For example, when a camera, which is capable of capturing an image within a 360-degree range, is worn by the user on the head or is attached to a bicycle in the state in which the camera is connected to a smartphone, the user may create real image content by consecutively capturing an image of a scene in front of the bicycle, which changes from moment to moment, during a predetermined time while moving on the bicycle, and may provide the created real image content as control content for the control of the virtual reality attraction 230.

In addition, according to an embodiment of the present invention, the real image content created by the user using the mobile terminal 210 may be provided to the virtual reality attraction 230 via the content server 250, which takes the form of a web server operating on the Internet, for example. In this case, the content server 250 may be connected to multiple mobile terminals 210 and multiple virtual reality attractions 230, and may provide control content, which may be used for the control of the virtual reality attraction 230, so as to be uploaded and downloaded.

To this end, for example, the content server 250 may store the real image content, uploaded via a content receiver 252, in a storage 256 as control content of the virtual reality attraction. In this case, the content receiver 252 may store the uploaded real image content along with predetermined tag information to facilitate search. The tag information may include, for example, words that assist the selection of appropriate content depending on the type of an attraction device, such as biking, skiing, extreme sports, and auto racing, or identification information of producers.

In addition, the content server 250 may provide the real image content, stored in the storage 256, so as to be downloaded to the virtual reality attraction 230 as control content of the virtual reality attraction 230 via a content provider 254. Here, the content provider 256 may add predetermined additional content (e.g., advertisement content) to the real image content to be downloaded.

Although the drawing illustrates that the real image content is directly downloaded from the content server 250 to the virtual reality attraction 230, this is merely given for the sake of simplicity of explanation, and the present invention is not limited to such a type of download. For example, the real image content may be downloaded from the content server 256 to the mobile terminal 210 of the user who intends to use the virtual reality attraction 230, and then may be transmitted from the mobile terminal 210 to the virtual reality attraction 230.

This system provides advantages in that ordinary people who have no special knowledge or experience may easily create control content of the virtual reality attraction 230 and in that the control content may be shared in various manners via the content server 250 that anyone can access. For example, when a user is a player who participates in a specific auto racing and a mobile terminal equipped with a camera is attached to an automobile, the user may create real image content by consecutively capturing an image of a scene in front of the automobile, which changes from moment to moment, during a predetermined time of the auto racing. Then, the user may upload the created real image content to the content server 250 along with tag information "auto racing". Thereafter, users of the virtual reality attraction 230, configured to enable the experience of virtual reality related to auto racing, may access the content server 250 and then may search for and download desired real image content using the tag information "auto racing" to use the real image content as control content.

In addition, according to such a system, virtual reality live broadcasting is also possible. For example, a user who participates in an auto racing may broadcast a program for the experience of virtual reality while uploading real image content captured in real time to the content server 250 in a streaming manner. At the same time, multiple users of the virtual reality attractions 230 for the experience of an auto racing, which receive the program for the experience of virtual reality, may download the real image content from the content server 250 in a streaming manner to use the real image content as control content, whereby multiple users may experience, in real time, an auto racing that one race car driver is racing in.

As described above, according to the present invention, it is possible to allow anyone to easily create control content of a virtual reality attraction based on a real image captured in reality, and to enable sharing of the control content in various manners.

Figure 3:
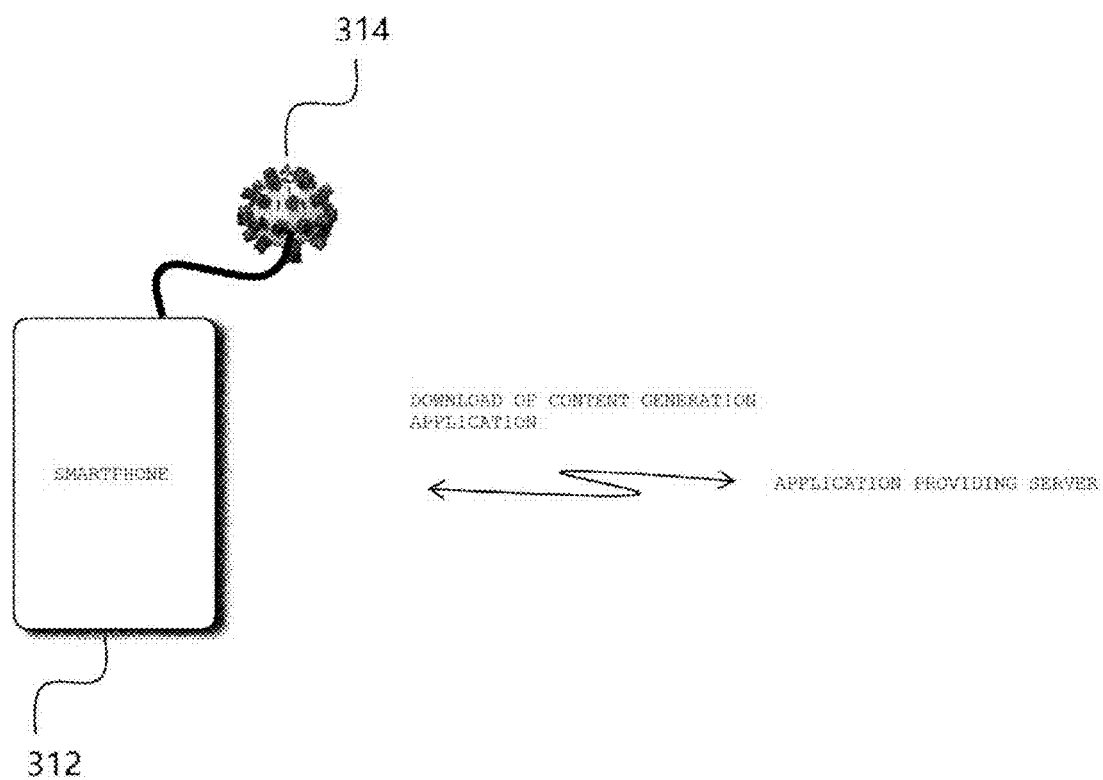
FIG. 3 is a schematic view illustrating the configuration of a mobile terminal for creating control content in a virtual reality attraction system according to an embodiment of the present invention.

FIG. 3 is a schematic view illustrating the configuration of a mobile terminal for creating control content in a virtual reality attraction system according to an embodiment of the present invention.

Referring to FIG. 3, the mobile terminal 310 includes a smartphone 312, a 360-degree image capturing camera 314 externally connected to the smartphone by a cable, and a content generation application which is downloaded from an application providing server and is provided in the smartphone. The smartphone 312 in recent years is a high-performance mobile computing device that realizes various functions of a processor, a large-capacity memory card, a touchscreen, a high-performance camera, time and position sensors, a gyro sensor, a GPS module, a Bluetooth transmission/reception module, and a wireless Internet communication module, for example. The smartphone 312 may be connected to a mobile memory device, such as an SD memory card or a USB memory device, and may receive and transmit data from and to another computing device when connected thereto by a cable.

According to the present invention, by simply providing a smartphone with a content generation application configured to generate real image content including image data captured by a camera and metadata, such as the time, position, speed, acceleration, and posture associated with the image data, the user may create control content, which enables easy control of a virtual reality attraction, without any expensive special equipment. In this case, the content generation application may be provided from, for example, the content server illustrated in FIG. 2, or may be provided by an existing smartphone dedicated application download server such as Google Play.

Figure 4:
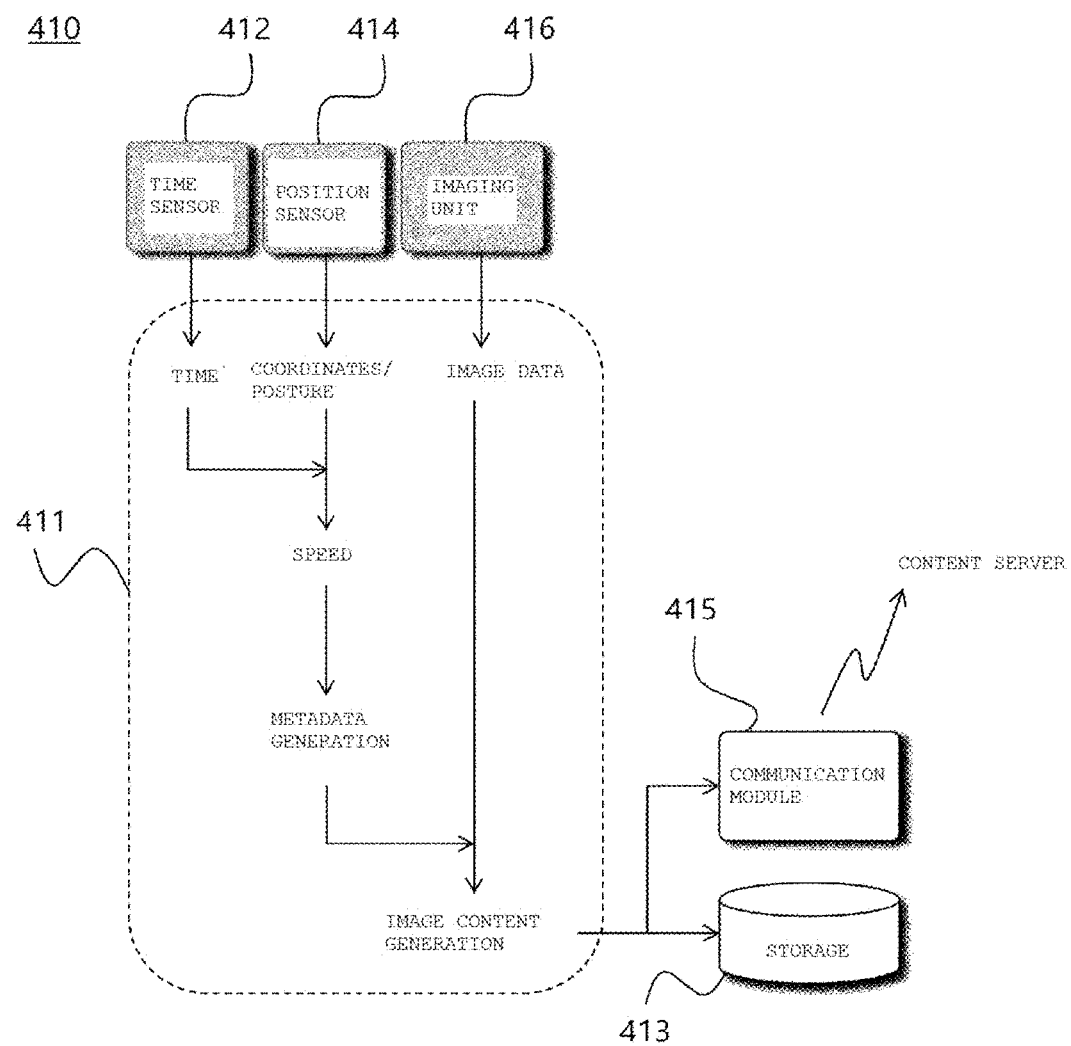
FIG. 4 is a schematic view for explaining a process of creating real image content as control content on the mobile terminal side according to an embodiment of the present invention.

FIG. 4 is a schematic view for explaining a process of creating real image content as control content on the mobile terminal side according to an embodiment of the present invention.

Referring to FIG. 4, in the illustrated example, the mobile terminal 410 includes a time sensor 412, a position sensor 414, an imaging unit 416, a content generation application 411, a communication module 415, and a storage 413. Such a configuration may be easily realized using an existing smartphone as described with reference to FIG. 3.

When the content generation application 411 is executed by a processor of the mobile terminal 410, the content generation application 411 generates real image content by combining metadata with image data generated by the imaging unit 416. The metadata may include data related to the time, coordinates, and posture sensed by the time sensor 412 and the position sensor 414, or may include additional data, such as the speed and acceleration calculated using the above-described data. The generated real image content may be transmitted to a content server via the communication module 415 simultaneously with the generation thereof. Alternatively, the real image content may first be stored in the storage 413 and then be uploaded to the content server.

In the illustrated example, although only time and position detection sensors are illustrated as sensors, this is merely given by way of example, and it can be appreciated that various other sensors may be used. In addition, although the sensors are illustrated separately from the imaging unit 416, this is merely given for conceptual discrimination, and a sensor may be installed in a camera device.

Figure 5:
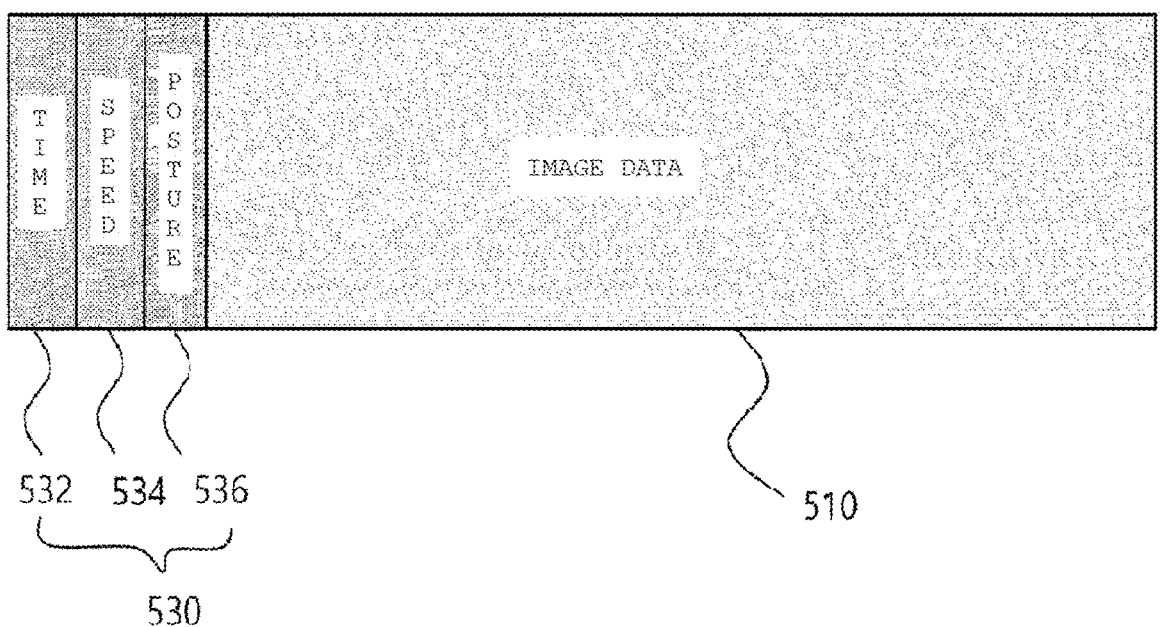
FIG. 5 is a schematic view illustrating the configuration in which real image content created according to an embodiment of the present invention includes image data and metadata.

FIG. 5 is a schematic view illustrating the configuration in which real image content created according to an embodiment of the present invention includes image data and metadata.

Referring to FIG. 5, image data 510 and metadata 530, which are components of real image content 500 according to the present invention, are illustrated. In the illustrated example, although the metadata 530 is illustrated as including a time value 532, a speed value 534, and a posture value 536, this is merely given by way of example, and it can be appreciated that other values that may be used for mechanical driving may also be included in the metadata.

Here, the image data 510 may be, for example, real moving image data. For example, the image data may be a moving image composed of 24 still image frames or 30 still image frames per second. According to the present invention, the image data 510 is not particularly limited so long as it satisfies the condition that it is an actually captured image. For example, the image data may include both analog and digital images, and may include a still image, a moving image, a two-dimensional image, a three-dimensional image, and a 360-degree image.

Meanwhile, according to an embodiment of the present invention, the metadata 530 may include a value of the time at which the corresponding image data 510 is captured and values indicating the position, instantaneous speed, instantaneous acceleration, and instantaneous posture of the mobile terminal at the time at which the image data is captured. Thus, the metadata 530 is not particularly limited so long as it satisfies the condition that it is sensed at the time at which the image data 510 is captured or that it includes a value calculated by sensed values. In other words, the metadata 530 may be referred to as data related to the coordinates (or position) of the mobile terminal, which is synchronized with the image data 510 by the time value.

Figure 6:
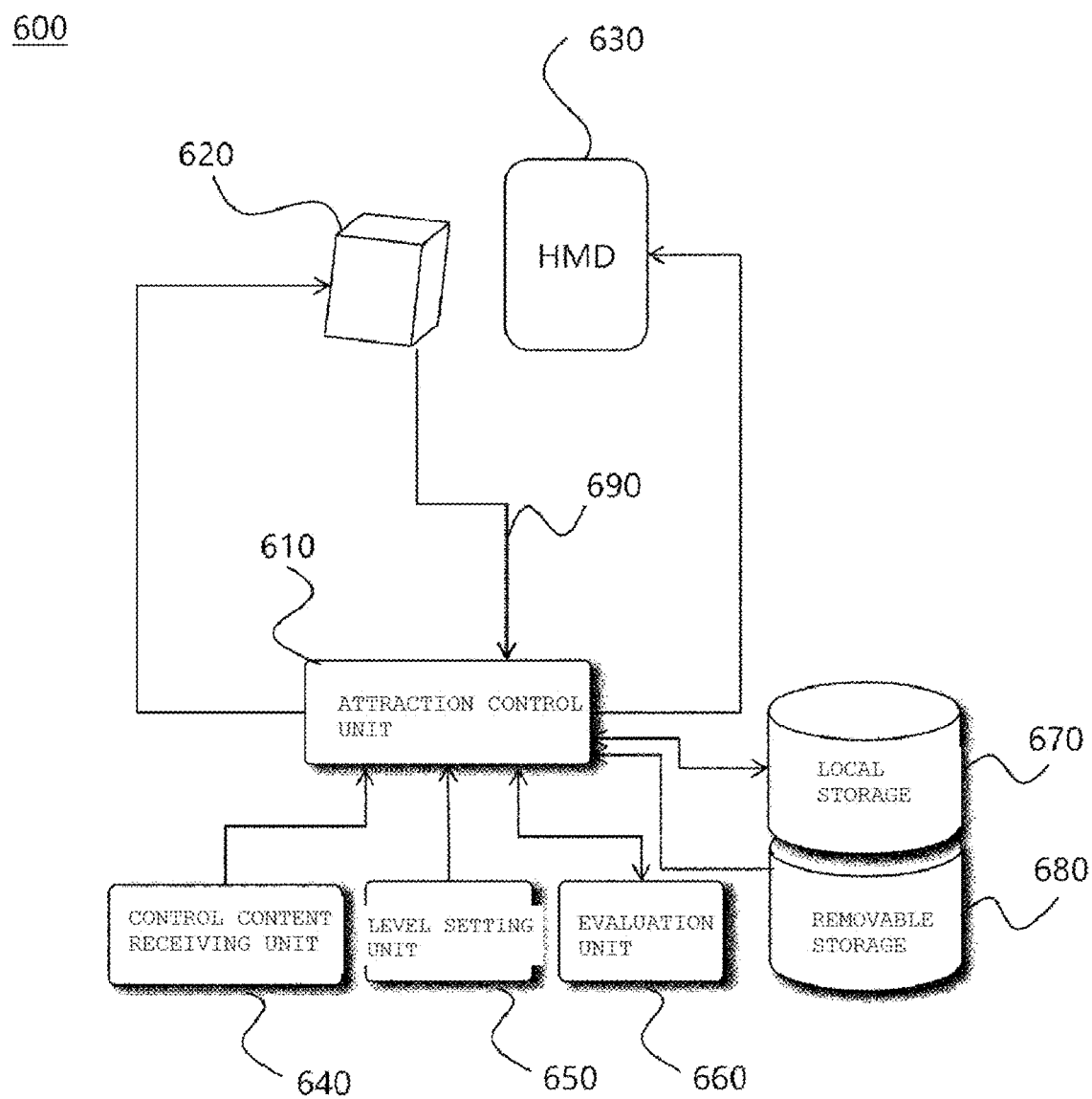
FIG. 6 is a schematic view illustrating the configuration of a virtual reality attraction device in a virtual reality attraction control system according to an embodiment of the present invention.

FIG. 6 is a schematic view illustrating the configuration of a virtual reality attraction in a virtual reality attraction system according to an embodiment of the present invention.

Referring to FIG. 6, in order to provide a further detailed illustration of the virtual reality attraction 230 which is briefly illustrated in FIG. 2, the configuration of a virtual reality attraction 600 is illustrated in detail. In the illustrated example, the virtual reality attraction 600 includes an attraction control unit 610, a machine component 620, an image component 630, a control content receiving unit 640, a level setting unit 650, an evaluation unit 660, a local storage 670, a removable storage 680, and a feedback line 690.

The attraction control unit 610 controls the movement of the machine component 620 using real image content described in FIG. 5 according to the present invention as control content, and controls the image component 630 so as to display image data synchronized with the movement.

The control content receiving unit 640 may be, for example, a communication module that receives real image content from the content server illustrated in FIG. 2 as control content. Alternatively, the control content may be stored in the local storage 670 and then be read by the attraction control unit 610. For example, the attraction control unit 610 may store real image content, which is received via the control content receiving unit 640 or is input via the removable storage 680, such as a USB memory card, in the local storage 670. The real image content stored in the local storage 670 may be uploaded to the content server, may be copied to the removable storage 680, or may be used for the control of the machine component 620 and the image component 630, for example, in response to a command input by the user of the virtual reality attraction 600.

In the illustrated example, the virtual reality attraction 600 includes the feedback line 690 through which a feedback command of the user may be input from the machine component 620. For example, when the virtual reality attraction 600 is a device for the experience of virtual reality related to a bicycle, the machine component 620 may include a steering device, i.e. a handle that allows the user who is on the machine component to control the heading direction and a pedal that allows the user to control the speed of cycling. In this case, a predetermined feedback signal, generated when the user operates the handle and the pedal, may be transmitted from the machine component 620 to the attraction control unit 610 via the feedback line 690. The feedback signal enables the attraction control unit 610 to control the movement of the machine component 620 and an image to be displayed on the image component 630 so as to provide the experience of virtual reality that enables interaction with the user. In other words, the attraction control unit 610 may instantaneously control virtual reality according to the level of the user in response to a feedback signal of the user.

The level setting unit 650 allows the user to limit the level of virtual reality to be experienced by the user to an appropriate level in advance. For example, in the case of virtual reality related to skiing, even if real image content generated by an intermediate user is selected as control content, the user of the virtual reality attraction 600 may actually set the experience level of virtual reality to an elementary level or an advanced level using the level setting unit 650. When the level is set as described above, the attraction control unit 610 may control the movement of the machine component 620 to an elementary level or an advanced level by increasing or decreasing, for example, the speed among data in the selected real image content of an intermediate level, and at the same time, may adjust the speed of an image to be displayed on the image component 630 to an elementary level or an advanced level.

In addition, in the illustrated example, the virtual reality attraction 600 further includes the evaluation unit 660. The evaluation unit 660 may evaluate and score the movement of the user by comparing the state in which the movement of the machine component 620 is adjusted in response to a user feedback signal with the movement of the machine component 620 before adjustment.

Figure 7:
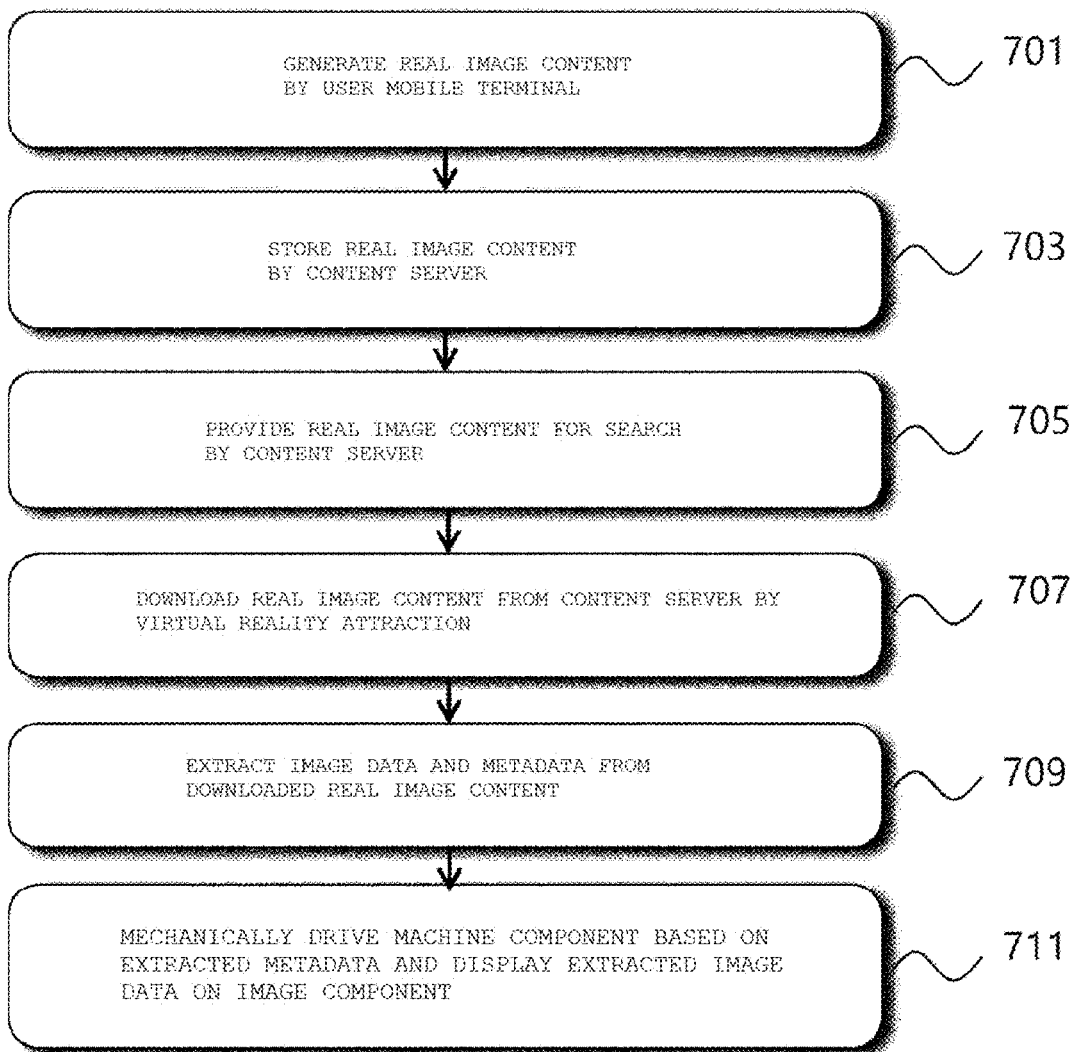
FIG. 7 is a flowchart illustrating the flow of a method for controlling a virtual reality attraction according to an embodiment of the present invention.

FIG. 7 is a flowchart illustrating the flow of a method for controlling a virtual reality attraction according to an embodiment of the present invention.

Referring to FIG. 7, in a virtual reality attraction control method 700 according to an example of the present invention, first, real image content is generated by a mobile terminal of the user (701). The generated real image content includes real image data and metadata.

The generation or creation of the real image content may be easily realized, for example, when the user captures an image of a time-varying scene in front of the user, for example, using a camera installed in their smartphone while skiing in the state in which the user installs a content generation application, which is capable of combining metadata with image data according to the present invention, in the smartphone and executes the content generation application.

The user may access a content server via the wireless Internet, for example, to upload and store, in the content server, the real image content, created by the user, as control content for controlling a virtual reality attraction that enables the experience of virtual reality related to a specific category (703). The content server may be a site that shares user-created content (UCC) such as YouTube (www.youtube.com).

The content server may then provide the uploaded and stored real image content for search (705). At this time, the user may add additional content (e.g., advertisement content) to each piece of the real image content uploaded to the content server. The advertisement content may be displayed only at the time of search, and may be downloaded as part of control content together with the real image content.

The user who has searched for desired real image content from the content server may download the real image content to a virtual reality attraction in order to use the real image content as control content (707).

Then, the virtual reality attraction may extract image data and metadata from the downloaded real image content (709), and may control the movement of a machine component based on the extracted metadata and display the extracted image data on an image component (711). In this case, the advertisement content may be included as part of the image data, and thus may be displayed, together with the image data, on the image component.

Figure 8:
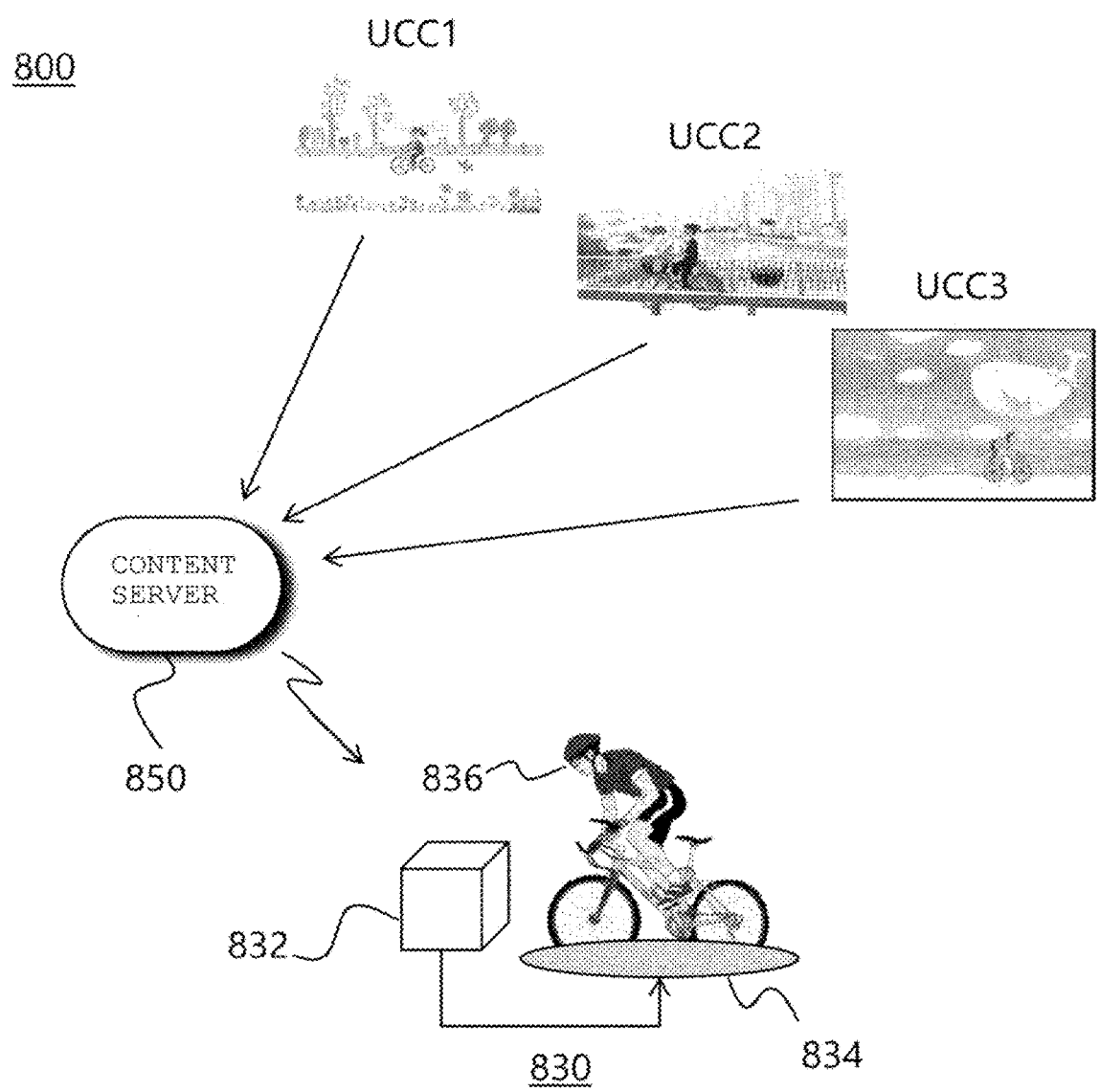
FIG. 8 is a schematic view illustrating an example of sharing real image content provided according to an embodiment of the present invention, and in particular, an example of selecting and sharing, by one virtual reality attraction, desired content among multiple pieces of real image content from a content server.

FIG. 8 illustrates an example of sharing real image content provided according to an embodiment of the present invention.

Referring to FIG. 8, in the illustrated example 800, in particular, a control unit 832 of one virtual reality attraction 830 selects and downloads a piece of desired content from among multiple pieces of real image content UCC1, UCC2, UCC3, . . . stored in a content server 850, and then controls a machine component 834 and displays an image on an HMD 836 worn by the user. In particular, this example allows the user to experience virtual reality of riding a bicycle for exercise. The illustrated example provides an advantage in that the user may exercise while enjoying virtual reality by selecting one of various scenes, such as a country road, a city, and a beach.

Figure 9:
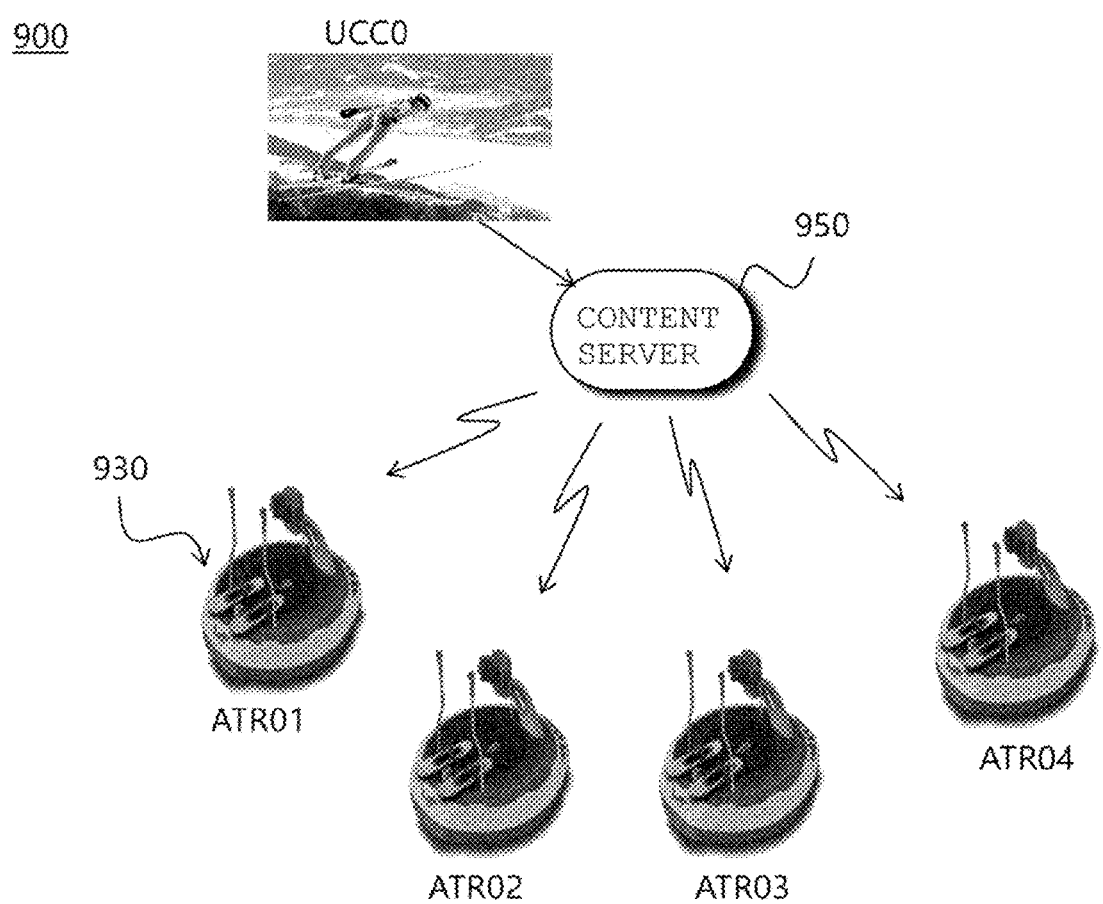
FIG. 9 is a schematic view illustrating an example of sharing image content provided according to an embodiment of the present invention, and in particular, an example of sharing, by multiple virtual reality attractions, one piece of image content via a content server.

FIG. 9 illustrates an example 900 of sharing image content provided according to an embodiment of the present invention.

Referring to FIG. 9, in particular, there is illustrated an example in which multiple virtual reality attractions 930 (ATR01 to ATR04, . . . ) share one piece of real image content UCC0 at the same time via a content server 950. In this case, the real image content UCC0 may be uploaded to the content server 950 in a streaming manner simultaneously with creation thereof, and may be downloaded from the content server 950 to the multiple virtual reality attractions 930 (ATR01 to ATR04, . . . ) in a streaming manner simultaneously with the upload thereof. This sharing illustrates a type of virtual reality live broadcasting.

While the present invention has been particularly illustrated and described with reference to exemplary embodiments thereof, it is to be understood that various modifications may be made by those skilled in the art by referring to and combining various features described herein. Therefore, it should be pointed out that the scope of the present invention is not limited to the described embodiments, but should be construed according to the appended claims.

The invention claimed is:

1. A method for controlling a virtual reality attraction that allows a user to experience virtual reality based on movement of a machine component on which the user is positioned and image data displayed to the user via an image component, the method comprising:
   generating real image content including real image data captured by a mobile terminal of the user and metadata including at least time data of a time at which the mobile terminal captures the real image data and position data of the mobile terminal;
   receiving, by the virtual reality attraction, the generated real image content as control content from the mobile terminal via a content server that provides a service capable of uploading or downloading the real image content through a communication network when both the mobile terminal and the virtual reality attraction are connected thereto through the communication network; and
   driving the virtual reality attraction so as to control the movement of the machine component based on the metadata of the received real image content and display the real image data of the received real image content on the image component by synchronizing the real image data based on the time data included in the metadata.

2. The method according to claim 1, wherein:
   the mobile terminal comprises a processor, a memory, a camera, a time detection sensor, and a position detection sensor;
   the mobile terminal is provided with a computer executable application for generation of the real image content for controlling the virtual reality attraction, the application being coded to perform, when executed by the processor, an operation of generating the real image content by combining the real image data captured by the camera with the metadata generated to include at least the time and position data of the time at which the real image data is captured from the time detection sensor and the position detection sensor; and
   the mobile terminal further comprises a storage that stores therein the real image content generated when the application is executed by the processor or a transmission module that transmits the real image content to an external device.

3. A virtual reality attraction system configured to perform the method for controlling the virtual reality attraction according to claim 2.

4. The method according to claim 1, wherein the metadata further comprises at least one of posture data indicating a posture of the mobile terminal and an acceleration or a speed indicating movement of the mobile terminal, in addition to the time data and the position data.

5. A virtual reality attraction system configured to perform the method for controlling the virtual reality attraction according to claim 4.

6. The method according to claim 1, wherein the generating the real image content by the mobile terminal, uploading the generated real image content to the content server, downloading the uploaded real image content from the content server to the virtual reality attraction, and the driving the virtual reality attraction based on the downloaded real image content are performed in real time.

7. A virtual reality attraction system configured to perform the method for controlling the virtual reality attraction according to claim 6.

8. The method according to claim 1, wherein the content server adds additional content so as to be to downloaded as part of the real image content, and the virtual reality attraction processes the additional content so as to be displayed to the user via the image component.

9. A virtual reality attraction system configured to perform the method for controlling the virtual reality attraction according to claim 8.

10. The method according to claim 1, wherein the driving the virtual reality attraction further comprises adjusting, based on feedback data input by the user via the machine component, the movement of the machine component based on the metadata and adjusting the image data to be displayed on the image component based on the adjusted movement of the machine component by the virtual reality attraction.

11. A virtual reality attraction system configured to perform the method for controlling the virtual reality attraction according to claim 10.

12. The method according to claim 1, wherein the driving the virtual reality attraction further comprises comparing, by the virtual reality attraction, feedback data input by the user via the machine component with movement data of the machine component to be driven based on the metadata, evaluating the user based on the comparing, and displaying an evaluation result to the user.

13. A virtual reality attraction system configured to perform the method for controlling the virtual reality attraction according to claim 12.

14. A virtual reality attraction system configured to perform the method for controlling the virtual reality attraction according to claim 1.

* * * * *